(12) United States Patent
Wagner et al.

(10) Patent No.: US 9,676,146 B2
(45) Date of Patent: Jun. 13, 2017

(54) PROCESS FOR THE PRODUCTION OF A LAMINATED COMPOSITE PRODUCT AND A COMPOSITE PRODUCT MADE BY THE LAMINATION PROCESS

(71) Applicants: Karl Wagner, Salzburg (AT); Florian Himmler, Grossgmain (AT); Peter Martin, Saaldorf-Surheim (DE)

(72) Inventors: Karl Wagner, Salzburg (AT); Florian Himmler, Grossgmain (AT); Peter Martin, Saaldorf-Surheim (DE)

(73) Assignee: Mubea Carbo Tech GmbH, Salzburg (AT)

( * ) Notice: Subject to any disclaimer, the term of this patent is extended or adjusted under 35 U.S.C. 154(b) by 171 days.

(21) Appl. No.: 13/736,649

(22) Filed: Jan. 8, 2013

(65) Prior Publication Data

US 2013/0143026 A1 Jun. 6, 2013

Related U.S. Application Data

(60) Continuation of application No. 13/296,477, filed on Nov. 15, 2011, now abandoned, which is a division of
(Continued)

(30) Foreign Application Priority Data

May 20, 2005 (EP) ..................................... 05011010
May 22, 2006 (EP) .................... PCT/EP2006/062510

(51) Int. Cl.
*B29C 45/14* (2006.01)
*B29C 70/02* (2006.01)
(Continued)

(52) U.S. Cl.
CPC ............ *B29C 70/026* (2013.01); *B29C 45/14* (2013.01); *B29C 70/086* (2013.01); *B29C 70/542* (2013.01); *B29C 70/78* (2013.01); *B29C 70/86* (2013.01); *B32B 5/26* (2013.01); *B29C 47/00* (2013.01); *B29C 47/003* (2013.01); *B29C 47/0023* (2013.01); *B29C 47/0038* (2013.01); *B29C 47/0054* (2013.01); *B29C 47/0057* (2013.01); *B29C 47/02* (2013.01);
(Continued)

(58) Field of Classification Search
CPC .............................. B29C 45/14; B29C 66/022
USPC ................. 156/212, 214, 228; 264/259, 279
See application file for complete search history.

(56) References Cited

U.S. PATENT DOCUMENTS 1,422,085 A * 7/1922 Davies ..................... B21D 1/05
72/205
2,766,808 A 10/1956 Kleiber et al.
(Continued)

FOREIGN PATENT DOCUMENTS

DE 199 59 652 A1 6/2001
FR 2 555 496 5/1985
(Continued)

*Primary Examiner* — Scott W Dodds
(74) *Attorney, Agent, or Firm* — Pauley Erickson & Kottis (57) ABSTRACT

The invention is directed to a process for the making of a product out of laminated composite material. The process in general comprises preforming at least one layer of material such that it corresponds to a surface of a part; applying layers of fibers to the preformed layer of material; and bonding the fibers by a resin to form a laminated composite material.

17 Claims, 3 Drawing Sheets

Related U.S. Application Data application No. 11/920,780, filed as application No. PCT/EP2006/062510 on May 22, 2006, now Pat. No. 8,057,622, which is a continuation of application No. PCT/EP2005/011010, filed on May 20, 2005.

(51) Int. Cl.

| | | |
|---|---|---|
| *B29C 70/08* | (2006.01) | |
| *B29C 70/54* | (2006.01) | |
| *B29C 70/78* | (2006.01) | |
| *B29C 70/86* | (2006.01) | |
| *B32B 5/26* | (2006.01) | |
| *B29C 47/00* | (2006.01) | |
| *B29C 47/02* | (2006.01) | |
| *B29C 51/08* | (2006.01) | |
| *B29K 33/00* | (2006.01) | |
| *B29K 67/00* | (2006.01) | |
| *B29K 69/00* | (2006.01) | |
| *B29K 77/00* | (2006.01) | |
| *B29K 105/12* | (2006.01) | |
| *B29L 9/00* | (2006.01) | |
| *B29C 47/06* | (2006.01) | |

(52) U.S. Cl.
CPC .......... *B29C 47/021* (2013.01); *B29C 47/062* (2013.01); *B29C 51/082* (2013.01); *B29C 2791/001* (2013.01); *B29C 2793/00* (2013.01); *B29K 2033/00* (2013.01); *B29K 2033/12* (2013.01); *B29K 2067/00* (2013.01); *B29K 2067/006* (2013.01); *B29K 2069/00* (2013.01); *B29K 2077/00* (2013.01); *B29K 2105/12* (2013.01); *B29L 2009/00* (2013.01); *B29L 2009/001* (2013.01); *B29L 2009/006* (2013.01); *Y10T 156/1031* (2015.01); *Y10T 428/24802* (2015.01); *Y10T 428/24994* (2015.04); *Y10T 428/249921* (2015.04); *Y10T 428/31504* (2015.04); *Y10T 428/31507* (2015.04); *Y10T 428/31551* (2015.04); *Y10T 428/31725* (2015.04); *Y10T 428/31786* (2015.04); *Y10T 428/31855* (2015.04)

(56) References Cited

U.S. PATENT DOCUMENTS

| | | | | |
|---|---|---|---|---|
| 3,615,276 | A | * | 10/1971 | Singleton ..................... 428/608 |
| 3,623,981 | A | * | 11/1971 | Giltrow et al. ................. 75/231 |
| 4,390,489 | A | | 6/1983 | Segal |
| 4,526,831 | A | | 7/1985 | Hatchadoorian et al. |
| 4,797,320 | A | * | 1/1989 | Kopp et al. ................. 428/316.6 |
| 4,968,551 | A | | 11/1990 | Kusanagi et al. |
| 5,074,770 | A | | 12/1991 | Graefe |
| 5,851,331 | A | | 12/1998 | Grenetier et al. |
| 5,951,802 | A | | 9/1999 | Deeks |
| 6,019,923 | A | | 2/2000 | Pelzer |
| 6,066,184 | A | * | 5/2000 | Brenner ............. H01M 2/0222 29/623.1 |
| 6,118,218 | A | | 9/2000 | Yializis et al. |
| 6,595,575 | B2 | | 7/2003 | Morris |
| 6,670,028 | B2 | | 12/2003 | Ellison et al. |
| 6,767,623 | B1 | | 7/2004 | Mock et al. |
| 6,770,230 | B2 | | 8/2004 | Delusky et al. |
| 6,929,711 | B2 | | 8/2005 | Benninger |
| 2001/0013669 | A1 | * | 8/2001 | Cundiff et al. ............... 264/103 |
| 2002/0150748 | A1 | | 10/2002 | Delusky et al. |
| 2003/0160365 | A1 | * | 8/2003 | Brown ......................... 264/553 |
| 2004/0070112 | A1 | | 4/2004 | Schroeder et al. |
| 2004/0217523 | A1 | | 11/2004 | Benninger |
| 2005/0013983 | A1 | | 1/2005 | Hilligoss |
| 2009/0202789 | A1 | | 8/2009 | Wagner et al. |
| 2012/0121884 | A1 | | 5/2012 | Wagner et al. |

FOREIGN PATENT DOCUMENTS

| | | | | |
|---|---|---|---|---|
| FR | 2 716 102 | | 8/1995 | |
| GB | 2 082 961 | | 3/1982 | |
| GB | 2082961 | A * | 3/1982 | ............ B29D 31/00 |
| GB | 2 290 045 | | 12/1995 | |
| GB | 2 306 402 | | 5/1997 | |
| JP | 06226762 | | 8/1994 | |
| JP | 07008594 | | 1/1995 | |
| JP | 07314474 | | 12/1995 | |
| WO | WO 84/02490 | | 7/1984 | |
| WO | WO 92/12850 | | 8/1992 | |
| WO | WO 94/03337 | | 2/1994 | |
| WO | WO 2005/070641 | | 8/2005 | |

\* cited by examiner

| Layer | Bonding of additional Layer | | Shaping of Layer | | | Matrix | | Reinforcing Fibers | Curing Process: | |
|---|---|---|---|---|---|---|---|---|---|---|
| | Surface activation | Primer: | Temperature: | Sequence: | Method: | Duroplast: | Type: | | Temperature: | Pressure: |
| Layer Material | PA, PC, PET, PUR, TPU, PMA, PMMA, PBT, PBTP and blends or coextruded materials thereof | | Corona, Plasma, Flame, ionization | | PP, PE: ca. 150° C PC, PMMA: ca. 200° C | | Epoxy-, Phenol-, Vinylester-, Zyanester-, Polyester-Matrix, BMI, | As Prepreg; application of dry fibers | max. 140° C | |
| | PE, PP, Polyolefine, PTFE, ETFE, Flourpolymers, and blends for demolding | EP, Polyester, PUR, on duroplastic Base; TPU, PMA, PA, PET, and blends on thermoplastic base | | Before applying of fibers (in separate mold) | | | As Prepreg; as wet but also as "wet" resin | Carbon-, Glass-, Aramid-Fibers, Hybrid, Basaltfibers, PET- and other artificial Fibers | | Up to 30bar in press |
| Thickness of Layer | Up to 2mm, In case of injection molding thicker/variable thickness | Method of application: | | | Deep-Drawing, Niebling-Method, Blowmolding, Injection Molding, Press, Spraying | | | | Vacuum: | With or without |
| | | Spraying, coating, electrostatic; extruding onto, laminating, laid onto | | | | | | | | |
| Appearance | Transparent; colored | Type, composition | | | | | | | | |
| | | Film, powder, liquid | | | | | | | | |

FIG. 3

PROCESS FOR THE PRODUCTION OF A LAMINATED COMPOSITE PRODUCT AND A COMPOSITE PRODUCT MADE BY THE LAMINATION PROCESS

CLAIM OF PRIORITY

This application is a continuation of U.S. patent application Ser. No. 13/296,447, filed 15 Nov. 2011, which is a divisional and claims the benefit of U.S. patent application Ser. No. 11/920,780, filed on 2 Apr. 2009, now U.S. Pat. No. 8,057,622, issued 15 Nov. 2011, which is a 371 of International Application PCT/EP2006/062510, filed 22 May 2006, which is a continuation of European Patent Application 05011010.5, filed 20 May 2005. These priority documents and their entire teachings are incorporated, by reference, into this specification.

FIELD OF THE INVENTION

The invention lies in the field of the production of parts and components made out of composite material.

BACKGROUND OF THE INVENTION

From the prior art, products made out of composite material are widely known. Compared to injection molded parts comprising a relatively low amount of undirected fibers, laminated composites provide a superior performance and quality which mainly results out of a high concentration of oriented reinforcing fibres. Compared to products made by injection or by resin transfer molding technology, laminated products are more extensive in production, e.g., in the airplane or the race car industry, high quality light-weight and stiff parts made out of carbon, glass, or Kevlar fibres are used in areas where metals or other materials are not applicable. Especially for thin-walled structures laminated composites are often the preferred choice albeit they are difficult to make. Normal machining methods are in general not useable or only of limited utility in the production of laminated composite parts.

In general laminated composite parts are made in a labor intensive process in which at first directed carbon fibers are laid layer by layer into a cavity of a mold according to a predetermined layout plan. Afterwards the fibers are bonded together by a resin such that in the final product the fibers are surrounded by the resin and joined to each other. The embedded fibers are in general responsible for the stiffness and the loading capacity of the final product whereby the resin supports the fibers laterally. A further function of the resin is the protection of the fibers against external impacts.

Especially in mass production one of the biggest disadvantages of the nowadays commonly used processes consist in that the tool/press used for curing the laminate product is similar to the tool used for preparing the layout of the fibers. Because it is to date not possible to move the non-finished laminate product from one tool to another one has therefore to wait until a curing process has come to an end and the equipment for curing becomes available for the next charge. An additional delay occurs due to the fact that nowadays, in general, it is necessary to adjust the temperature of the mold after one part has been made such that it becomes possible to lay the fibers out for the next part.

Today's production processes for composite materials which are based on autoclaves and prepreg press-technique often cause problems with respect to inclusion of air. In both processes, the production is based on tools with cavities which must be threatened with a form release agent such that the product is not bonded to the cavity. The form release agent causes a reduction of the surface energy and avoids sufficient wetting of the mould surface which leads to inclusion of air during the curing process of the resin. The inclusions are in the final part visible as pores or visible air bubbles which are well noticeable and affect the quality of the final product. In subsequent heat treatment, e.g. to increase the glass transition temperature (Tg), the inclusions of air may cause the surface to burst such that the final product is defective or additional treatment of the product is necessary to avoid additional pores affecting the quality. Beside potential influence on the load capacity, visible pores are in a high quality product not tolerable.

To obtain a high quality product, surfaces of laminated products must nowadays be coated by a clear coating which is very time and cost intensive. Normally the product is first coated by a clear coating or a primer which then needs to be dried. Subsequently it is necessary to grind and to subsequently clean the surface. Afterwards the exterior surface needs to be stopped/leveled out and dried again. Then an additional grinding and cleaning of the surface is in general necessary which then will be coated by a primer and the top coating. The repetition of the before mentioned steps may be necessary and depends mainly from the amount of pores present. By the today available production processes the formation of pores may not be prevent. As it becomes obvious the making of high quality laminated products is extremely time and cost consuming. Thereby the today available production processes are not applicable for the production of larger series of high quality laminated products.

DESCRIPTION OF PRIOR ART

U.S. Pat. No. 6,770,230 (US2002/0150748), to The University of Massachusetts, is directed to a compression molded article. The article in general comprises an outer plastic film layer, a first plastic layer adhered to the outer plastic film layer and a second plastic layer adhered to the first plastic layer. Fibers having a length of 8 to 100 mm are admixed with the second plastic layer. The patent publication describes a method for producing articles using composite materials containing reinforcing fibers. The method utilizes a film layer to impart color to the article. The method comprises depositing a film onto a first plastic layer, which is adhered to a second plastic layer and compression molding the layers to produce a molded article having a layered structure. U.S. Pat. No. 6,670,028, from the University of Massachusetts, is directed to a molded article including a plastic layer. The document describes a method for producing a molded plastic article using composite materials containing reinforcing fiber. The method utilizes a film layer to impart color to the article. A colored decorative layer and an outer film layer are deposited onto a layer of composite reinforcing material, which is adhered to a plastic layer. The product is formed by compression molding the layers.

JP07008594, to Tonen Corp, is directed to the production of a shaft of a ski. It is an aim to easily provide a ski stick with an attractive appearance without separate coating. A method for manufacturing a shaft for a ski stick using composite materials and reinforcing fibers is disclosed. An ornamental layer to impart decorative value to the article is used, whereby a transparent fiber-reinforced resin layer is applied to an ornamental layer having a pattern and a color.

U.S. Pat. No. 6,595,575, to Morris Mike, describes an aftermarket kit for vehicles which comprises protective and decorative vehicle body panels to be attached to an existent vehicle body structures. The panels include a rigid, resilient substrate layer, such as ABS, to provide increased resistance of a vehicle provided with the panels to damage from impacts with other objects. The panels include a decorative layer visible through an overlying protective layer. The decorative layer provides the appearance of desirable materials, such as wood or carbon fiber and the protective layer provides increased resistance of the panels to damage from impinging ultraviolet radiation. The panels can optionally be formed in complex three-dimensional concave and convex curves to provide additional aesthetic appeal and to better conform to complex vehicle contours.

U.S. Pat. No. 6,019,923, to HP-Chemie Pelzer Research & Development Ltd., describes a method for producing molded plastic articles using composite materials containing reinforcing fibers. The method utilizes a decorative layer to impart aesthetic appeal to the article in that a decorative layer, a support film and a thermoplastic material are co-extruded to produce molded articles which are having complex geometrical shapes.

U.S. Pat. No. 5,851,331, to Salomon S A, is directed to a process for decorating a composite article such as a ski, a snowboard, a surfboard or a skateboard. The process for decorating a composite article includes the preparation of an assembly with a reinforcement structure of an article made of a resin that is capable of flowing when heated during a subsequent cycle of hot pressing. In a first cycle a decoration is prepared by imprinting ink on a first surface of a layer made of a transparent or translucent plastic material. In a second cycle the assembly, which is on a first surface decorated, is assembled by an adhesion film. The document in general describes a method of decorating a composite article using a decorative film and a colored contrast sheet. The colored contrast sheet may comprise natural or synthetic fibers. The method comprises affixing the decorative film and the colored contrast sheet onto the composite article using an adhesive film or a hot or press assembly.

U.S. Pat. No. 4,968,551, to Pioneer Electronic Corporation et al., is directed to a method for the manufacturing of an acoustic vibrator member using composite material containing reinforcing fibers. A decorative film is used to impart a decoration to the article. A continuous substrate sheet with a composite fiber-reinforced resin is formed by providing an adhesive between a substrate sheet and a decorative film, laminating the decorative film onto the substrate sheet, and forming said integrated sheet into a predetermined shape of a vibrator member.

US2005013983A1, to the Patent Holding Company, describes a method for producing a molded article using composite materials containing reinforcing fiber. The method utilizes an in-mold paint sheet to impart color and finish to the article. The in-mold paint sheet is installed in the cavity of the mold before composite materials containing reinforcing fibre are inserted into the cavity of the mold. By cooling the in-mold paint sheet a molded article having a layered structure is produced.

US2004070112A1, to Schroeder et al., is directed to a method and an arrangement for bonding a film applique to a resin transfer molded item such that a bright, textured and/or colored surface results. The film is vacuum formed and placed into a female cavity of a mold. The film bonds to the molded item during the resin molding process and solidification steps. The disadvantage of such products is that they comprise a relatively low amount of fibers compared to products made by a lamination process. A further disadvantage consists in that the orientation of the fibers is very inaccurate compared to laminated products.

GB2290045 (JP7314474A2) provides a profile fiber reinforced plastic (profile CFRP) and a method for making thereof. One purpose is to provide a CFRP with good mechanical property, in which the embedded carbon fibers are invisible to the naked eye, outward appearance is good and the surface is free from undulation. The thickness is regulated to 1 mm. A CFRP is produced in that carbon fiber having a fiber length of 10 mm to 100 mm are distributed two-dimensionally and irregularly in a matrix formed of thermosetting resin. An uneven pattern transferred from a die is provided on the surface of the outer face side of a flat board part and the surface layer of the projected part is practically formed of only resin, and thickness of the flat board part is 1 mm. The profile CFRP is molded by molding dies having an uneven pattern on the inside surface, the uneven pattern is transferred on the surface of the flat board part from the molding dies.

JP06226762 describes a method to prevent the interfacial release of a multilayer bathtub by generating the curing and heating reaction of the fiber reinforced plastic from the interface with the resin molding to the outer surface direction of the fiber reinforced plastic layer. The problem is solved in that an acrylic resin is molded as a resin molded object into the shape of a bathtub by a vacuum mold to be cooled to a degree having a shape holding property and demolded from the vacuum mold. The acrylic resin is placed on a temperature control stand to be heated by the heat from a stand. Then FRP is sprayed on the upper surface of the acrylic resin by a spray-up method. By this constitution, FRP generates the shrinkage accompanied by curing from the interface with the acrylic resin. Therefore, both materials are originally bonded to obtain excellent bonding strength. The durability of the bathtub as a product is enhanced and the bathtub free from deformation and excellent in dimensional accuracy is obtained.

FR2716102 describes a further method for making of tubs. Bathtubs, washbasins and shower trays are made with an outer layer of acrylic resin forming the visible exterior surface and at least one internal layer of material providing mechanical rigidity. A backing layer of polyurethane foam greater than 10 mm thickness and with a density of greater than 25 kg/m. The outer surface layer is produced by thermoforming of a sheet of acrylic resin such as polymethyl methacrylate (PMMA). The reinforcing layer is made out of glass fiber reinforced polyester resin having a thickness of 0.8 mm to 1.2 mm which is applied directly onto the back of the thermoformed sheet. The backing layer of polyurethane foam is applied by spraying the foam mix onto the glass fiber reinforced polyester layer in that the polyester resin has gelled but before the resin is fully cured to give good bonding between the reinforcing layer and the foam layer. Generally the glass reinforced polyester layer is allowed to stand at room temperature for ca.1 hour before applying the foam.

WO9212850 describes a process for forming a laminated body by introducing a foil into a mold, a thermosettable compound into the mold and closing and heating the mold whereby the laminated body is formed and the compound is cured. The foil is fully or partly deep-drawn with vacuum before, during or after the compound is introduced and before the mold is completely closed. Laminated bodies according to the present invention are applicable for use in, for example, aerospace components, dish aerials, decorative plates having a smooth and/or reflecting surface, or plastic parts which are not statically charged. One disadvantage is that shrinkage cannot be compensated. A further disadvantage of the method consists in that the cycle time is comparable long.

WO9403337 is directed to the making of a paint film by injection molding. The paint film includes an extruded clear coat layer, a liner layer releasably attached to the outer surface of the clear coat layer to assist in injection molding of the paint film to a substrate, a color layer, a reinforcing layer and an optional bonding layer. The paint film may be applied by injection molding methods including applying a paint film to a deep-drawn injection molded part during molding without the use of preformed inserts. Slides may be used to overcome undercuts on the part which are covered by paint film.

XP000657785 to Plastech Ltd describes a removable tool system, for resin transfer molded objects (RTM) which reduces cycle time. RTM is a method for making of elastomeric or duro-plastic parts. RTM is a low pressure molding process, where a mixed resin and catalyst are injected into a closed mould containing a fiber pack or perform (prewoven). One intention of the method described by Plastech is to speed up the slow process steps in the RTM molding cycle (applying the surface coat to the tool, placing the fiber reinforcement, closing the tool, demolding). Therefore a multi-insert tooling (MIT) is described which allows the tool to be removed from the press with the part still in place. Another shaped tool can then be dropped into the press. MIT comprises a low cost skin form which fits exactly into the tool and can be locked into place. One intention is to replace metal tools. It is described that the tools can be made in hours, compared with the weeks often needed to produce a traditional composite tool. The composite skin of the tool is produced in the same way as a conventional tool then mounted on an aggregate bolster. Heating elements can be mounted in the bolster allowing the skin to be heated rapidly if required. It is described that a traditionally produced 2 m2 gel-coated piece typically has at best a 35 minutes total cycle time, some 10 minutes of which are required to inject and cure. It becomes obvious that this solution is rather complicated and not applicable for parts made out of laminated composite material according to the herein discussed invention.

GB2306402 is directed to a press tool for shaping of metal foil. The press tool comprises a liner intended to contact and shape a sheet material during pressing and support means for supporting the liner. The liner is preferably readily replaceable and may comprise a sheet of plastics material such as polystyrene.

FR2555496 relates to a molding process. First a model is made of an article to be molded. Then a mold is made from this model, in bringing a curable resin into contact with the molding surface, allowing the resin to cure and then in demolding the cured resin. The mold is produced by thermoforming, using a thermoplastic material, by heating the latter to its softening point, by applying a thin layer of the thermoplastic material thus softened to the model so that it adopts, in whole or in part the shape of model and then by allowing the thermoplastic material to return to its original consistency after it has taken up the shape of the model.

U.S. Pat. No. 5,074,770 discloses an apparatus for the integrated vacuum forming and reaction injection molding of a shaped polymeric laminate article such as sanitary items, such as a bathtub, or a motor vehicle body panel possessing a vacuum formed thermoplastic resin cosmetic layer bonded to a thermoset resin backing layer. In an embodiment an exposed surface of a vacuum formed preform is treated within a cavity of a sealed reaction injection mold by plasma or chemically reactive gas to modify the polymeric structure of the resin at such surface without affecting the bulk properties of the resin and thereby improve the adherent property of the preform for the subsequently formed thermoset resin layer.

GB2082961 is directed to a self-supporting element for motor vehicle body interiors. The self-supporting polymeric insert comprises a heat deformable soft surface layer and a foam half-layer. The process of making comprises the steps of vacuum forming the surface layer on a mould plug, transferring the preformed layer into a corresponding female mould, closing the split mould, and forming the self-supporting insert by injection of a rigid polyurethane two-component material. In another method the insert is injection molded, its surface rendered tacky, and the surface layer vacuum formed onto it.

WO2005070641 was filed before the priority date of the present patent application but published thereafter. Therefore this prior art document is only of limited relevance regarding the patentability of the herein discussed invention. WO2005070641 is directed to a method for the production of multiple identical moulds suitable for molding products from composite materials. The method comprises the steps of forming a sheet of material onto an open face primary mould former which has a shape which corresponds to a required shape for the mould. The second face of the sheet is utilized to determine the shape of subsequently molded products because the quality of the face remote from the former is described as being better for molding. The mold is itself formed by molding and the product is subsequently molded by using the mold. The sheet material is described as being thermoformable. It is further described that the mould former must be suitably shaped in order to accommodate the difference in size of the mould compared to the mould former due to the thickness of the sheet. One disadvantage is that the mold described is not applicable for the use in high-quality application.

Problems to be Solved

It is one object of the herein discussed invention to provide a process to produce a product made out of a composite material, especially composite material with a determined/oriented setup especially with long fibers (e.g. above 100 mm), having an improved surface quality. It is a further object of the present invention to provide a process for the production of a product made out of a composite material improving the durability of the product. It is a further object of the present invention to provide a process which reduces the cycle time for the production of a product made out of a laminated composite material. It is still a further object of the present invention to provide a process which offers the opportunity to reduce the occupation and the wear out of an expensive production mould.

SUMMARY OF THE INVENTION

The above mentioned problems are solved by the invention as defined in the annexed claims.

To overcome the problems known from prior art a process according to the herein disclosed invention foresees the utilization of at least one separate additional layer of material which is adapted to a surface of the final product by preforming. In general the additional layer of material is in advance 3-dimensionally preformed in a separate process in a preforming tool, e.g. by deep-drawing in an appropriate deep-drawing tool, injection molding in an injection molding tool, blow molding in a blow molding tool, pressing in a pressing tool, before it is utilized in a lamination process together with a laminated composite material, e.g. in that it is bonded to the composite material.

In general the preforming tools are only used for preforming of the additional layer. Because of the different process parameters, the preforming tools are in general not applicable and are therefore not used in the bonding process for making of the final part. Depending on the field of application, the additional preforming tools, e.g. such as an injection molding tool, a deep-drawing tool, a blow molding tool and/or a pressing tool have a different shape then the final product to compensate shrinkage of the additional outer layer. This may be necessary when the additional layer of material is made by a thermoforming process at a much higher temperature (e.g. 270° C., see also FIG. 3) compared to the curing process of the final part. In general the shape of the additional tools is 0.9% to 2.5% oversized and/or undersized by a similar value. The compensation may also have an oriented character in that x-, y- and/or z-axis have different compensation values due to different shrinkage of material in the different directions. Alternatively or in addition shrinkage may also be applied locally only.

In difference to methods wherein a sheet material having a uniform thickness is 3D formed, additional layers of material made by an injection molding process may have variable thickness at different locations or may be in addition or alternatively be filled with a filling material to obtain a special characteristics.

The additional layer of material is preferably arranged at a top surface (top layer) of the final product taking influence onto the final appearance, behavior and capabilities of the product. A further advantage consists in that by the additional layer it becomes possible to move a non-cured part from a first location to a second location, e.g. from a preforming tool into a production tool, such that the production process becomes more efficient. In a preferred embodiment the additional layer of material consists out of a thermoplastic foil which is bonded as a continuous surface to a composite material. In difference to a bulky local insert the additional layer of material provides in general a two-dimensional part of the surface of the final part.

Alternatively or in addition an at least one additional layer may be designated as a production aid only such that the use of a form release agent may be avoided. In this case fibrous material is applied to the additional (preformed) layer inside or outside of a tool (auxiliary or production). Then the fibrous material is placed together with the additional layer in the production tool. After curing the composite material is taken out of the mold together with the additional layer and the additional layer is separated from the composite material by an appropriate process. This results in the advantage that the composite material may easily be treated in a further process, e.g. by painting, because the surface of the composite material is protected from external contamination as long as the additional layer covers the surface.

In this case a material is chosen for the additional layer which is detachable from the composite material. The preforming tool to making of the additional layer of material is in this case designed such that it compensates shrinkage of the material and/or the local thickness of the additional layer of material.

The additional layer further may offer the advantage that the wear out of an expensive production mould is significantly reduced due that the direct of the abrasive fibers with the surface of the mould may be avoided. A further advantage results in that by the additional layer of material avoided impressions of dividing lines of the mould or of the ejectors in the mould may be avoided. The additional layer of material may be designed and arranged such that it may be used as an ejector help.

The herein disclosed invention offers the possibility to produce in a single production process products which have a finished high quality surface, i.e. products with surfaces which need no additional surface treatment after the product has been taken out of the mold. A further advantage consists in that no separate and cost intensive varnishing of the surface is necessary. Still a further advantage consists in that it becomes possible to provide component parts having a transparent or colored high gloss finished surface without pores.

By the use of a three dimensional preformed additional layer of material it becomes possible to perform the step of applying the layers of oriented fibers outside the bonding tool/press. Thereby the production tool/press becomes available for other products and variation of the temperature of the production tool can be avoided.

To achieve sufficient bonding between an additional layer of material and the composite material it may be necessary to undertake the additional layer of material to a surface treatment. Good results have been achieved by treating the additional layer of material in a plasma chamber and/or flaming and/or corona treatment of at least one surface whereby the surface structure and/or polarity is modified. Alternatively, or in addition, bonding may be additionally improved by an appropriate coating with a primer and/or a hot-melt adhesive. Alternatively, or in addition, the primer or the adhesive may be applied by spraying and/or laminating and/or electrostatic lay-down and/or deep drawing.

If necessary, an additional bonding layer may be foreseen between the additional outer layer and the layers of fibers to improve the bonding between several layers. The bonding layer may be flat or 3-dimensionally shaped, if necessary, by a separate process. Good results have been achieved by a layer of woven or non-woven fleece material, such as polyester fleece or glass fleece.

Before or after a possible surface treatment, the additional layer is adopted to the surface of the final product in a preforming tool and/or an auxiliary tool. Compared to the production tool, the auxiliary tool may be designed much simpler and is therefore much cheaper to make. The lay out of the fibre material may take place in the same or one or more additional auxiliary tools outside the production tool. For bonding the fiber material and the additional layer of material are transferred separately or together with the part of the auxiliary tool into the production tool.

After bonding and curing of the component additional treatment may take place in- or outside an auxiliary tool, e.g. by a CNC-cutting device (laser, water jet). To accurately position the additional layer of material in the production and/or the auxiliary tool at least one of the tools may comprise positioning means. Good results have been achieved in that the additional layer is at least partially held and positioned in the tool by vacuum and/or by a positive geometry of the layer forming a temporary anchor in the tool. To apply a vacuum the surface exposed to the additional layer may comprise at least one opening to apply the vacuum.

In difference to the prior art, by the present invention it becomes possible to run the production tool for making of parts comprising laminated composite material at constant temperature (isotherm). Thereby a significant saving of time and/or energy is achieved because the heat up and the cooling down of the production tool can be completely avoided. In difference to the prior art cycle time is e.g. not depending any more from the time necessary to lay up the fiber material or number of production tools available but it is rather depending from the reaction time of the matrix material used.

For the additional layer of material at least one out of a group of the following materials is preferably used: polyethylene terephthalate (PET), polycarbonate (PC), polyamide (PA), polymethyl methacrylate (PMMA), polybutylene terephthalate (PBT, PBTP), polyurethane (PUR), acrylic films, multilayered films or blends out of these materials. Non-bonding, removable additional layers are preferably made out of polyolefin materials such as polyethylene (PE) or polypropylene (PP). However, other materials may be applicable depending on the field of application.

If appropriate at least one area of the additional layer of material is coated, varnished and/or screen printed and/or decorated by a transfer comprising a picture and/or written information, whereby the treated surface may be exposed to the composite material or arranged externally. In the case that the printed decorated surface is arranged inside the at least one outer layer is made out of a sufficiently transparent material such that the information is visible from the outside. In this case first the at least one additional layer of material is 3-dimensionally shaped in a preforming tool, then the additional layer is at least partially coated as described above in or outside of an auxiliary tool, then at least one layer of fibers is applied to the coated additional layer inside or outside the same or a different auxiliary tool and then the coated additional layer is transferred into a production tool together with the fibers where the final bonding takes place.

The at least one layer of material may comprise a certain amount of fibrous material itself. If appropriate, the at least one layer of additional material does only cover part of the final products, e.g. areas which need special protection or need to have a certain surface characteristic.

In general the lamination process is carried out directly into the additional layer which does not bond to the production tool. Thereby no form release agent is necessary to separate the fibrous material from the production tool. Especially the following disadvantages may thereby be avoided: no remains of form release agent; no cleaning of the tool necessary to remove form release agent; no scattering of the surface gloss; no treatment of the mold with form release agent; no contamination due to form release agent; wearout of the moulds.

For handling a semi-manufactured product the additional material layer may comprise mounting links arranged such that they may be grabbed manually or by an appropriate handling device.

The present invention provides the following advantages over the prior art available:

By the additional material layer on top and by using a scratch-resistant material for the additional material layer the composite material is protected and the final product becomes a scratch-resistant surface;

The additional material layer may provide an improved UV- and light resistance to the final product resulting in an improved resistance to aging;

Improved adhesive strength with respect to other materials;

Less emission (e.g. of solvents) in that the additional material layer acts as barrier layer;

Protection, e.g., of passengers or goods in case of failure of the composite material due to overloading, in that the additional material layer is made out of a ductile material it may be prevented that slivers of composite material may penetrate into a passenger compartment.

Protection of passengers in case of fire: by an appropriate choice of the material for the additional material layer, it becomes possible to protect passengers or goods in case of fire.

In a preferred embodiment the process according to the present invention comprises in general the following production steps:

a) preforming at least one additional layer of material, e.g. by heating and/or deep drawing and/or extruding and/or injection molding the at least one additional layer into an appropriate tool;

b) if required treating or modifying the surface of the at least one additional layer, e.g. the surface is coated/modified in a plasma chamber, preferably low pressure plasma chamber, flaming or coating;

c) applying layers of oriented fibers directly or indirectly to the at least one additional layer dry or in form of a prepreg (fibers, woven or non-woven, pre impregnated with a resin) according to a lay-out plan inside or outside the cavity of a tool;

d) bonding of the laminate and the at least one top layer.

The at least one additional layer of material may itself comprise more than one layer. Furthermore it becomes possible to apply a label, logo or information in written form to the at least one layer or between several layers. If appropriate the additional layer may be provided with a special texture or appearance at a surface such that the product obtains a special haptic attribute or may be more easily bonded to another part/material. It furthermore becomes possible to apply color to the preformed additional layer before it is bonded to the composite material in a lamination process.

In a further preferred embodiment a further layer of foil is arranged between the additional layer and the composite material which increases the bondability between the additional layer and the composite material. Good results have been achieved by meltable foils which may be activated by heat.

Instead of deep drawing of the additional layer it is possible to make the additional layer, e.g., by injection molding or another appropriate process, as long as the additional layer provides sufficient stability.

An embodiment of the invention is directed to a process for the production of a part comprising laminated composite material, said process comprising the following steps: a) preforming at least one layer of material in a preforming tool such that it corresponds at least partially to a surface of the part; b) applying layers of fibers to the preformed layer of material; c) bonding the fibers by a resin in a production tool to form a composite material. The layers of fibers consist in a prepreg already comprising adhesive or in dry material. The layer of material may be preformed by heating and/or deep drawing in a deep drawing tool and/or extruding in an extruding tool and/or injection molding in an injection molding tool and/or blow molding in a blow molding tool. The layer of additional material is in general preformed in a preforming tool and the layers of fibres are applied to the preformed layer of material in an auxiliary tool specially provided for the application of fibers. The preformed layer of material may be bonded to the composite material by hot melt glue. Alternatively or in addition a layer of material may be separated after the bonding of the fibers from the composite material. The surface of the layer of material may be undertaken to a treatment to increase and/or decrease the surface polarity and/or the adhesion properties before receiving the layers of fiber material. Depending on the field of application, the at least one layer of additional material is made in a preforming tool which actively compensates dimensions and/or shrinkage of the material of the at least one layer of additional material in the following bonding process. Typical values of compensation are in the range of 0.9% to 2.5% compared to the final product.

The invention also covers a product made by the process according to the described method which comprises composite material which is bonded to at least one preformed layer of material. The preformed layer of material of the product consists out of a thermoformable material preformed by heating and/or deep drawing and/or extruding and/or injection molding and/or blow molding. The preformed layer of the product is arranged at an outside surface of the product. The preformed layer of material of the product may comprise at least one material out of the group of polyethylene terephthalate (PET), polycarbonate (PC), polyamide (PA), polymethyl methacrylate (PMMA), polybutylene terephthalate (PBT, PBTP), polyurethane (PUR), acrylic films, fibrous material. If necessary an additional layer may be arranged between the composite material and the preformed layer of material. The additional layer is a layer of paint and/or a layer of hot-melt glue and/or layer comprising visible information.

BRIEF DESCRIPTION OF THE DRAWINGS

The terms and expressions which have been employed are used as terms of description and not of limitation, and there is no intention of excluding any equivalents of the features shown and described or portions thereof in the use of such terms and expressions, but it is recognized that various modifications are possible within the scope of the invention claimed.

For a more complete understanding of the present invention, including its features and advantages, reference is now made to the detailed description of the invention, taken in conjunction with the accompanying drawings, in which.

DETAILED DESCRIPTION OF THE PREFERRED EMBODIMENTS

Reference is now made in detail to embodiments of the invention, examples of which are illustrated in the accompanying drawings.

Figure 1:
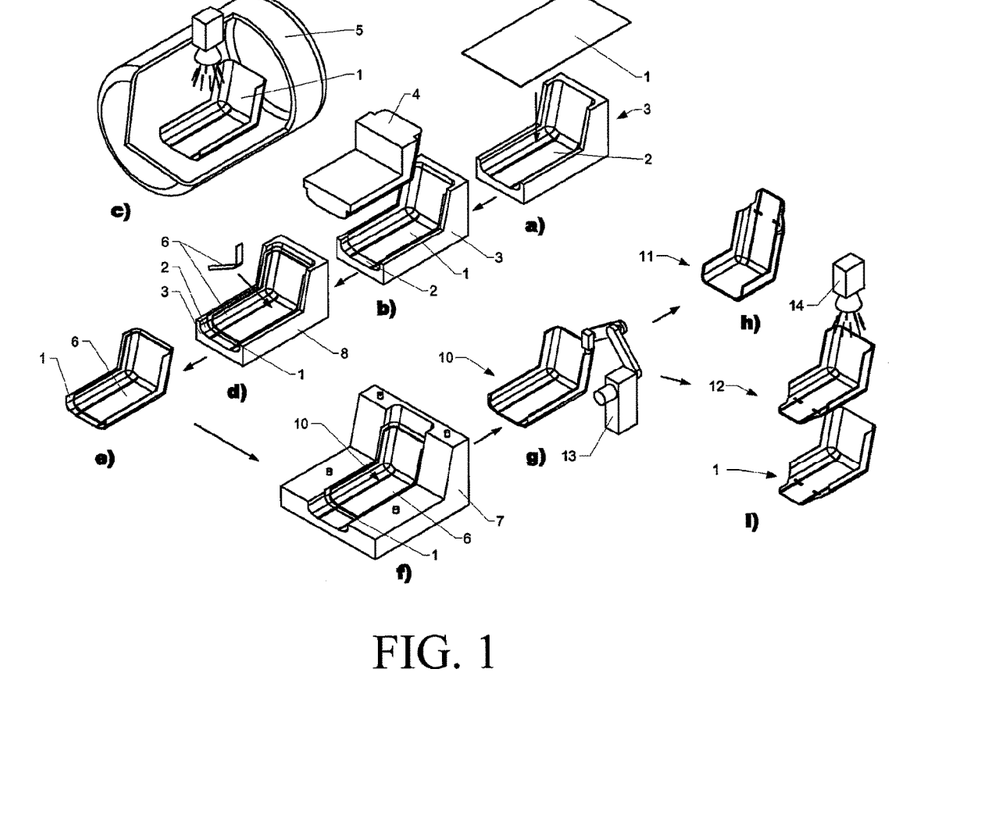
FIG. 1 is showing steps of a process according to the present invention.

FIG. 1 is showing in a simplified manner steps of making a product in a process according to the present invention.

As it can be seen in FIG. 1 *a*), a foil layer 1 is put into a cavity 2 of a preforming tool 3 in which the foil 1 is 3-dimensionally formed, here by a stamp 4 in a deep drawing process (see FIG. 1 *b*)), until it fits to a surface of the cavity 2, to form an outer layer of material.

Alternatively or in addition other forming processes are possible depending on the field of application such as pressure forming in a pressure forming tool, injection molding in an injection molding tool, blow molding in a blow molding tool or extrusion in an extrusion tool. If appropriate, the foil 1 may be provided in this step with a special texture or surface structure. Depending on the field of application, the cavity 2 of the preforming tool 3 is designed, respectively shaped such that it actively compensates shrinkage of the material of the additional layer 1. The preforming tool 3 is run in general at a different temperature then a production tool.

Before or after the deep drawing process, the foil 1 may be subjected to a surface treatment as described above. Here a plasma chamber 5 (see FIG. 1 *c*)) is schematically shown to indicate increase or decrease of the bondability of the layer 1 in a subsequent process. Alternative or additional surface treatment, such as coating and/or painting and/or varnishing and/or labeling and/or printing and/or texturing of foil 1 is possible.

As it can be seen FIG. 1, d) fibre material 6 is then applied to the preformed layer 1 inside or outside the same or an additional auxiliary tool 8. As it can be seen the foil layer 1 is here still in the cavity 2 of the preforming tool 3. One advantage consist in that if layer 1 is sufficiently stable, e.g. due to its 3-dimensional shape it has obtained by process step 1, it is possible to apply the fibre material 6 outside and separate from the preforming tool 3 such that the preforming tool 3 becomes available for a following charge.

After the fibre material 6 is applied to the layer 1, the layer 1 and the fibre material 6, which is supported by the layer 1 is separated from the preforming tool 3 (see FIG. 1 *e*)) and then inserted into a production tool 7 for bonding of the fibre material 6 and the layer 1 (see FIG. 1 *f*)). In difference to prior art the production tool 7 can be run at isotherm conditions. This means that the tool needs not to be cooled and heated again to receive a next item. In the shown embodiment the layer 1 provides stability to the fibre material 6 such that the package does not fall apart. In the production tool 7 the fibers and the resin of the composite material are bonded together. Depending on the field of application the composite material is simultaneously bonded to the layer 1. In another embodiment of the process according to the present invention, layer 1 serves as a transportation and production means which will later be separated from the composite material (see FIG. 1 *i*)).

After the lamination process of FIG. 1 *f*) has come to an end, product 10, comprising fibre material 6 and layer 1, is separated from the production tool 7 and if necessary undertaken to a subsequent process step such as machining by a CNC-milling system 13 (see FIG. 1 *g*)). At the end results a final product 11 (see FIG. 1 *h*)) or an intermediate product 12 which is undertaken to further process steps, e.g. such as painting by a painting machine 14 (see FIG. 1 *i*)). As it can also be seen in FIG. 1 *i*) the layer 1 is in this embodiment not foreseen to form an integral part of the final product. Therefore layer 1 is separated at an appropriate stage from the product 12. The preforming tool 3 may have a different shape/size than a production tool to actively compensate shrinkage.

Figure 2:
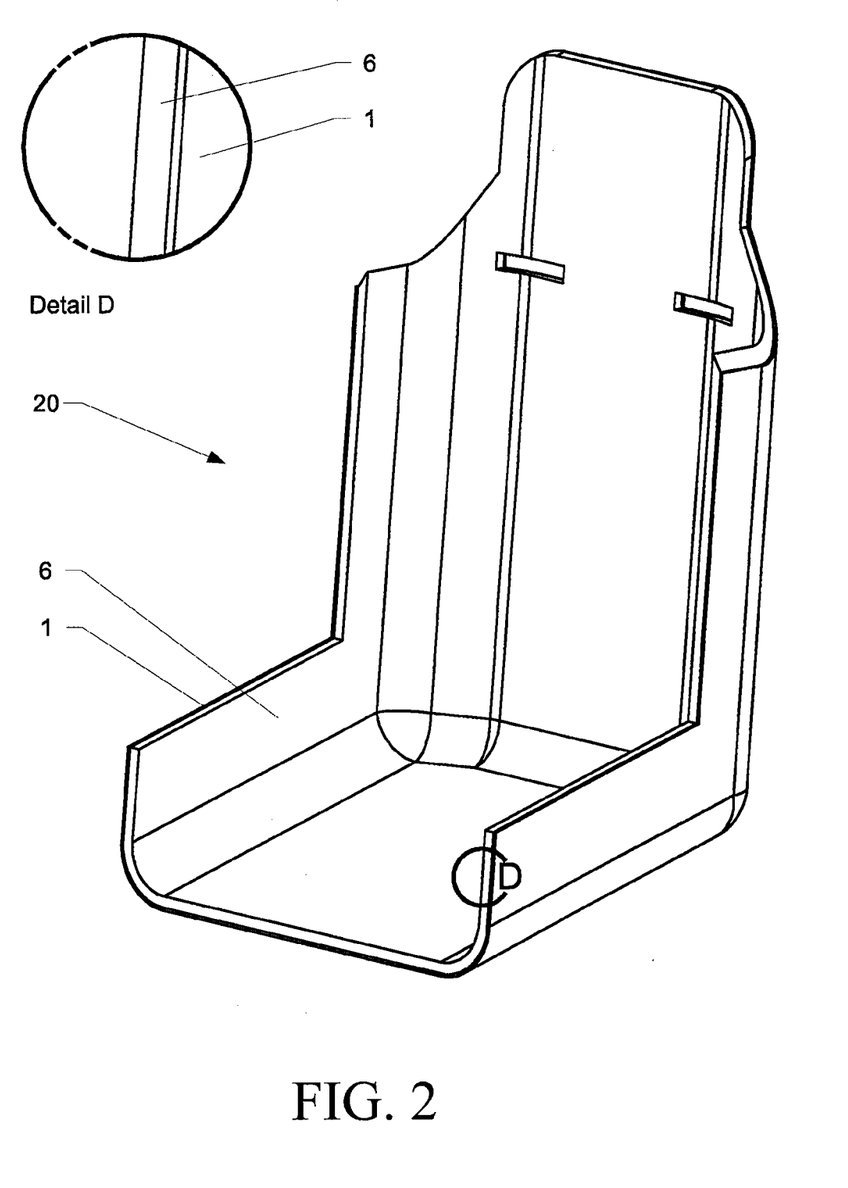
FIG. 2 is showing a product made according to a process according to the present invention.

FIG. 2 is showing a product, here a seat shell 20, e.g., for a car or an airplane, made by a process according to the present invention. As it can be seen in detail D the shell 20 comprises in general a setup with two layers—an external layer 1 and an internal layer 6. The external layer 1 consists in a foil which is 3-dimensionally preformed by a deep-drawing process. The inner layer 6 consists in composite material which is bonded in a lamination process. The foil 1 is brought into the 3-dimensional shape before the lamination process and provides here sufficient stability that it is capable to receive the composite material without collapsing e.g. during handling. In the final product the external layer 1 protects the composite material of the internal layer 20. The external layer 1 may be transparent or opaque or multilayered or colored being coated by an appropriate coating or paint on the inside and/or the outside. In difference to the herein shown embodiment, the product 20 may comprise more then two layers, e.g., it is possible that the composite material 6 is covered on both sides (inside and outside) by a preformed layer 1.

Figure 3:
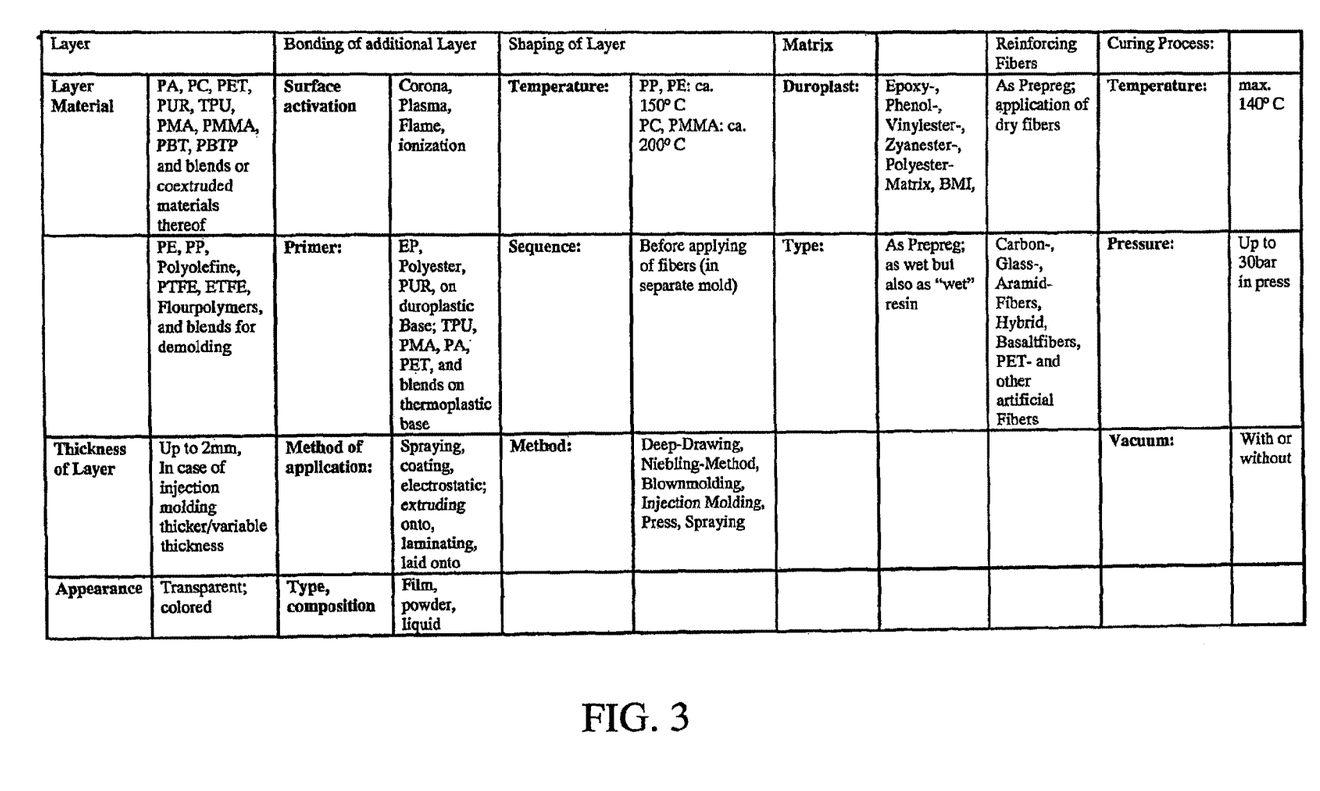
FIG. 3 shows a table with details about embodiments of the present invention.

FIG. 3 is showing the setup of samples made according to the herein described invention. Application examples of such parts are structural and decorating parts, e.g., in cars; substitution of paint and/or finish.

We claim:

1. A process for the production of a part comprising the following steps:
   a) providing a preforming tool (3) and a production tool (7);
   b) providing a sheet of material having a first profile to the preforming tool (3);
   c) processing the sheet of material in the preforming tool (3) such that the sheet of material is preformed from the first profile to a second profile that is different from the first profile and that corresponds at least partially to a surface (2) shape of the part;
   d) next applying layers (6) of fibers to the preformed sheet of material (1) outside of the production tool (7) and prior to insertion into the production tool (7);
   e) next inserting the preformed sheet of material (1) and fibers onto a support surface of the production tool; and
   f) next bonding the fibers by a resin in the production tool (7) to form a composite material, wherein the composite material (6) is bonded to the at preformed sheet of material (1).

2. The process according to claim 1 wherein the preformed sheet of material (1) is an outside surface of the part.

3. The process according to claim 2, wherein the preformed sheet of material (1) comprises at least one material out of the group of polyethylene terephthalate (PET), polycarbonate (PC), polyamide (PA), polymethyl methacrylate (PMMA), polybutylene terephthalate (PBT, PBTP), polyurethane (PUR), acrylic films and fibrous material.

4. The process according to claim 3, wherein an additional layer is arranged between the composite material (6) and the preformed sheet of material (1).

5. The process according to claim 4, wherein the additional layer comprises at least one of a layer of paint, a layer of hot-melt glue and a layer comprising visible information.

6. The process according to claim 1, wherein the sheet of material comprises a foil.

7. The process according to claim 1, wherein the preformed sheet of material (1) is a continuous surface to the composite material.

8. The process according to claim 1, wherein the part is formed of the composite material, and the preformed sheet of material (1) is a foil surface layer on the composite material to form an outer surface of the part.

9. The process according to claim 1, wherein the sheet of material is stamped into the surface shape of the part by the preforming tool (3).

10. The process according to claim 1, wherein the preformed sheet of material (1) is treated after removing from the preforming tool (3) and before the applying layers (6) of the fibers.

11. The process according to claim 1, wherein the part is an intermediate part and further comprising further processing the intermediate part to form a final product.

12. The process according to claim 2, further comprising coating the outside surface.

13. A process for the production of a part comprising the following steps:
   a) providing a preforming tool (3) and processing a sheet of material in the preforming tool (3) such that the sheet is preformed from a first profile to a second profile that is different from the first profile and that corresponds at least partially to a non-planar surface (2) shape of the part, wherein the preformed sheet of material (1) is arranged at an outside surface of the part;
   b) removing the at-least-one preformed sheet of material (1) from the preforming tool (3);
   c) after step b), applying layers (6) of fibers to the preformed sheet of material (1) outside of the production tool (7) and prior to insertion into the production tool (7);
   d) next inserting the preformed sheet of material (1) and fibers onto a support surface of the production tool; and
   e) providing a production tool (7) and bonding the fibers by a resin in the production tool (7) to form a composite material, wherein tire composite material (6) is bonded to the preformed sheet of material (1) and an additional layer is arranged between the composite material (6) and the preformed sheet of material (1).

14. The process according to claim 13, wherein the additional layer comprises at least one of a layer of paint, a layer of hot-melt glue and a layer comprising visible information.

15. The process according to claim 13, wherein the sheet of material comprises a foil.

16. The process according to claim 13, wherein the preformed sheet of material (1) is a continuous surface to the composite material.

17. The process according to claim 13, wherein the sheet of material is stamped into the surface shape of the part by the preforming tool (3).

* * * * *